United States Patent
Lee et al.

(10) Patent No.: US 6,266,145 B1
(45) Date of Patent: Jul. 24, 2001

(54) APPARATUS FOR MEASUREMENT OF AN OPTICAL PULSE SHAPE

(75) Inventors: Hak Kyu Lee; Dong Sung Lim; Min Yong Jeon; Joon Tae Ahn; Kyong Hon Kim, all of Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/441,532

(22) Filed: Nov. 16, 1999

(30) Foreign Application Priority Data

Aug. 18, 1999 (KR) .................................................. 99-34076

(51) Int. Cl.⁷ ...................................................... G01B 9/02
(52) U.S. Cl. ............................................................ 356/450
(58) Field of Search ..................................... 356/450, 451

(56) References Cited

U.S. PATENT DOCUMENTS

| | | |
|---|---|---|
| 4,472,053 | 9/1984 | Wyatt et al. . |
| 4,480,192 | 10/1984 | Albrecht et al. . |
| 5,033,853 | 7/1991 | Frangineas, Jr. . |
| 6,091,495 | * 7/2000 | Ogawa et al. ........................ 356/450 |

OTHER PUBLICATIONS

H. Takara et al., 100 Gbit/s optical waveform measurement with 0.6ps resolution optical sampling using subicosecond supercontinuum pulses, Electronics Letters, Jul. 7, 1994, pp. 1152–1153.

M. Jinno et al., Optical sampling using nondegenerate four–wave mixing in a semiconductor laser amplifer, Electronics Letters, Sep. 1, 1994, pp. 1489–1491.

L.P. Barry et al., Autocorrelation of ultrashort pulses at 1.5$\mu$ based on nonlinear response of silicon photodiodes, Electronic Letters, Sep. 26, 1996, pp. 1922–1923.

* cited by examiner

*Primary Examiner*—Samuel A. Turner
(74) *Attorney, Agent, or Firm*—Cohen, Pontani, Lieberman & Pavane

(57) ABSTRACT

An apparatus for measurement of an optical pulse shape intended to measure the temporal waveform of an ultrashort single optical pulse is disclosed. The present invention comprises a linearly chirped supercontinuum light source that is synchronized with an optical pulse to be measured; a nonlinear optical interferometer to transform the temporal waveform of an incident optical pulse into a spectrum using an incident light from said supercontinuum light source; and an optical spectrum analyzer to measure the wavelength of the light passing through the nonlinear interferometer so that it can measure the temporal waveform of a single optical pulse. The present invention employs the method that transforms the temporal waveform of an incident optical pulse into a spectrum and measures the wavelength using a linearly chirped supercontinuum light source, a nonlinear optical interferometer, and an optical spectrum analyzer. The present invention provides an apparatus for measurement of an optical pulse shape that is able to measure the waveform not with the repeated measurements but with a single shot measurement.

4 Claims, 2 Drawing Sheets

APPARATUS FOR MEASUREMENT OF AN OPTICAL PULSE SHAPE

BACKGROUND OF THE INVENTION

1. Field of the Invention

The present invention relates to an apparatus for measurement of an optical pulse shape intended to measure the temporal waveform of an ultrashort single optical pulse.

2. Description of the Prior Art

In the prior art, the conventional method of measuring the waveform of an ultrashort optical pulse converts an incident optical pulse into an electrical signal by use of a fast-photo diode, and measures the signal by a wide-bandwidth oscilloscope. However, the pulsewidth of the optical pulse that is able to be measured by a fast-photo diode and wide-bandwidth oscilloscope is limited in about 50 ps. Therefore, a streak camera is used for measuring the waveform of an optical pulse having a pulsewidth of a few ps, however, it can only measure in the range from near ultraviolet to near infrared and has a high-price. Thus, it is required to develop a measurement apparatus that is able to measure the waveform of a short pulse having narrower than a few ps pulsewidth or for a spectrum in which a streak camera can not measure. On the other hand, dislike the direct measurement method of the waveform, a pulsewidth, which is one of the important informations of an optical pulse, can be determined by measuring the second order auto-correlation using a nonlinear optical effect. In this method, the second harmonic lightwave and two photons absorption is mainly used to produce a nonlinear effect.

FIG. 1 is a view illustrating the structure of a prior-art apparatus for measurement of the pulsewidth of an optical pulse using the second harmonic lightwave.

A nonlinear optical effect causes interactions between numerous incident lights and produces a new light with a frequency of the sum or difference of the frequencies of the incident lights. In order words, it produces a light with different wavelength (Here, the frequency and the wavelength are inversely proportional to each other.). The process that two lights, each has the same frequency of ω, interact each other in a nonlinear optical medium and produce a light with a frequency of 2 ω is called the second harmonic lightwave generation. The procedures to measure the pulsewidth using the second harmonic lightwave is a follows:

At first, one divides the optical pulse 1 to be measured into two optical pulses using a 50:50 optical beam splitter 2 and makes the two divided lights proceed in different routes respectively. At this stage, a time delayer 3, which is able to control the time delay between the two lights, is located in one route and a reflection mirror 4 is located in the other route. The two lights is combined by a 50:50 optical coupler 2, then the combined light passes through a lens 5 and incidents to a nonlinear optical crystal 6. The second harmonic lightwave is generated thereon according to the intensity of the light. Since the second harmonic lightwave comes out with the light having a frequency of ω, one should eliminate the light having a frequency of ω by a filter 7 and thereafter, measures the second harmonic lightwave by a photo diode 18 or a photo multiplying tube (PMT).

In the procedures, the intensity of the second harmonic lightwave is determined by the overlapped amount of two optical pulses when they are coupled. In other words, in case that the time delay between the two lights is so large that they can not be overlapped when they are coupled, the intensity of the second harmonic lightwave becomes very small, and in case that the time delay is zero, the intensity of the second harmonic lightwave gets its maximum value. Therefore, if one operates the time delayer 3 with a fixed velocity and measures the intensity of the second harmonic lightwave generated, one can find the amount of overlapped pulses and measure the pulsewidth thereby. This method, however, has a drawback that one should assume the waveform of a pulse to find an accurate pulsewidth.

FIG. 2 is a view illustrating the structure of a prior-art apparatus for measurement of the pulsewidth of an optical pulse using two photons absorption effect.

A light-absorbing material has an energy band gap corresponding to the energy of the incident light. In the energy band gap of the material is bigger than the energy of the incident light, the light is not absorbed but transmits. However, the intensity of the incident light gets high, an absorption still happens in this case. This phenomenon is one of nonlinear phenomena of the medium, and it happens in a medium of which the energy band gap is twice as much as the energy of the incident light. This is called two photons absorption effect. The two photons absorption effect increases proportional to the intensity of the incident light. The apparatus for measurement of the pulsewidth of an optical pulse using the two photons absorption effect is similar to that of the method using the second harmonic lightwave as described in FIG. 1. The procedures to measure the pulsewidth using the two photons absorption effect is as follows:

One divides the optical pulse 11 to be measured into two optical pulses using a 50:50 optical beam splitter and makes the two divided lights proceed in different routes respectively. At this stage, a time delayer 13, which is able to control the time delay between the two lights, is located in one route and a reflection mirror 14 is located in the other route. The two lights is combined by a 50:50 optical coupler 12. The combined light passes through a lens 15 and is measured by a photo diode 18.

The difference between the two apparatuses described in FIGS. 1 and 2 is that the latter does not use a nonlinear medium but make use of the two photons absorption effect of a photo diode used for measurement. This method has advantages that it has simpler structure than the method of using the second harmonic lightwave and the fabricating price is low. However, it has a drawback that the sensitivity is lower than that of the method of using the second harmonic lightwave. And with this method, one should also assume the waveform of a pulse to find an accurate pulsewidth.

SUMMARY OF THE INVENTION

It is therefore an object of the present invention to provide an apparatus for measurement of an optical pulse shape that is able to measure the real waveform of an ultrashort optical pulse by transforming the temporal waveform of an incident optical pulse into a spectrum using a linearly chirped supercontinuum light source and a nonlinear optical interferometer.

To achieve the object, the apparatus for measurement of an optical pulse shape in accordance with the present invention comprises a linearly chirped supercontinuum light source that is synchronized with an optical pulse to be measured; a nonlinear optical interferometer to transform the temporal waveform of an incident optical pulse into a spectrum using an incident light from the supercontinuum light source; and an optical spectrum analyzer to measure the wavelength of the light passing through the nonlinear interferometer so that it can measure the temporal waveform of a single optical pulse.

BRIEF DESCRIPTION OF THE DRAWINGS

The above object and other advantages of the present invention will become more apparent by describing in detail the preferred embodiment of the present invention with reference to the attached drawings in which.

Similar reference characters refer to similar parts in the several views of the drawings.

DETAILED DESCRIPTION OF THE INVENTION

Referring to appended drawing, detailed description of the present invention is now described.

Figure 1:
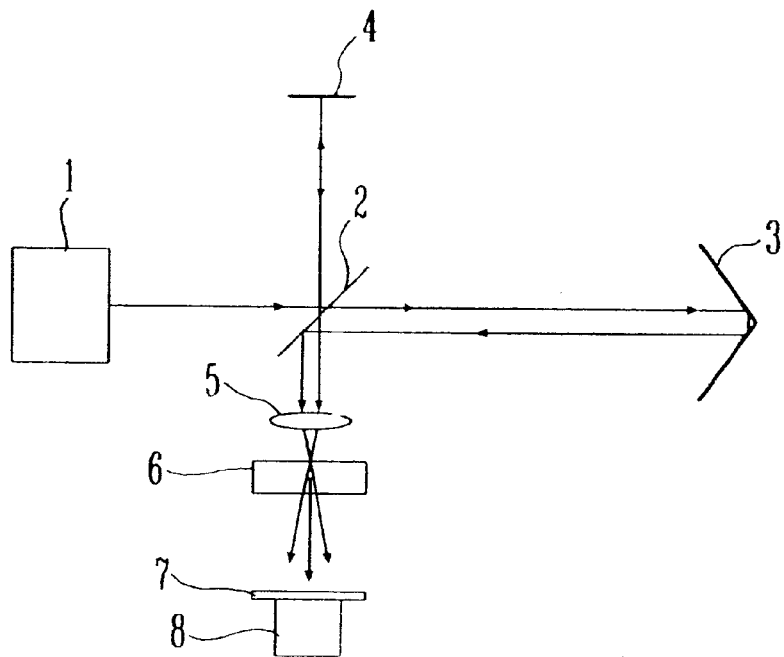
FIG. 1 is a view illustrating the structure of a prior-art apparatus for measurement of the pulsewidth of an optical pulse using the second harmonic lightwave.
Figure 2:
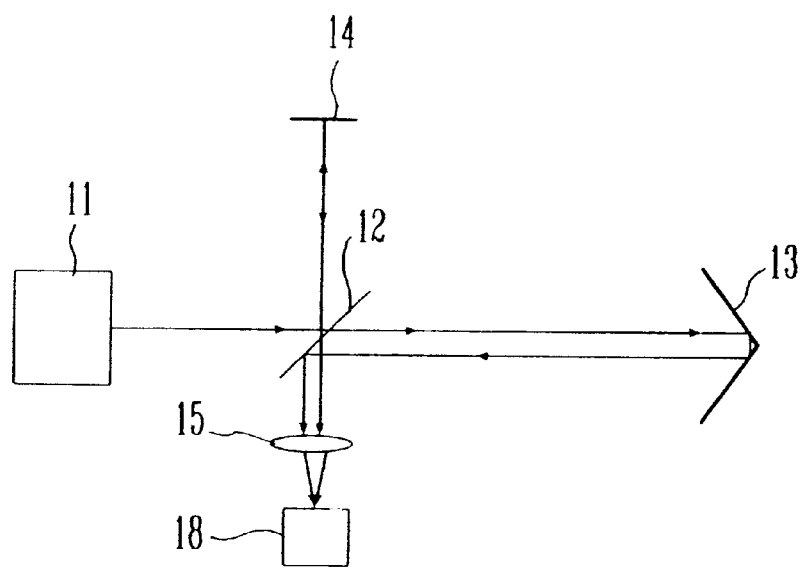
FIG. 2 is a view illustrating the structure of a prior-art apparatus for measurement of the pulsewidth of an optical pulse using two photons absorption effect.
Figure 3:
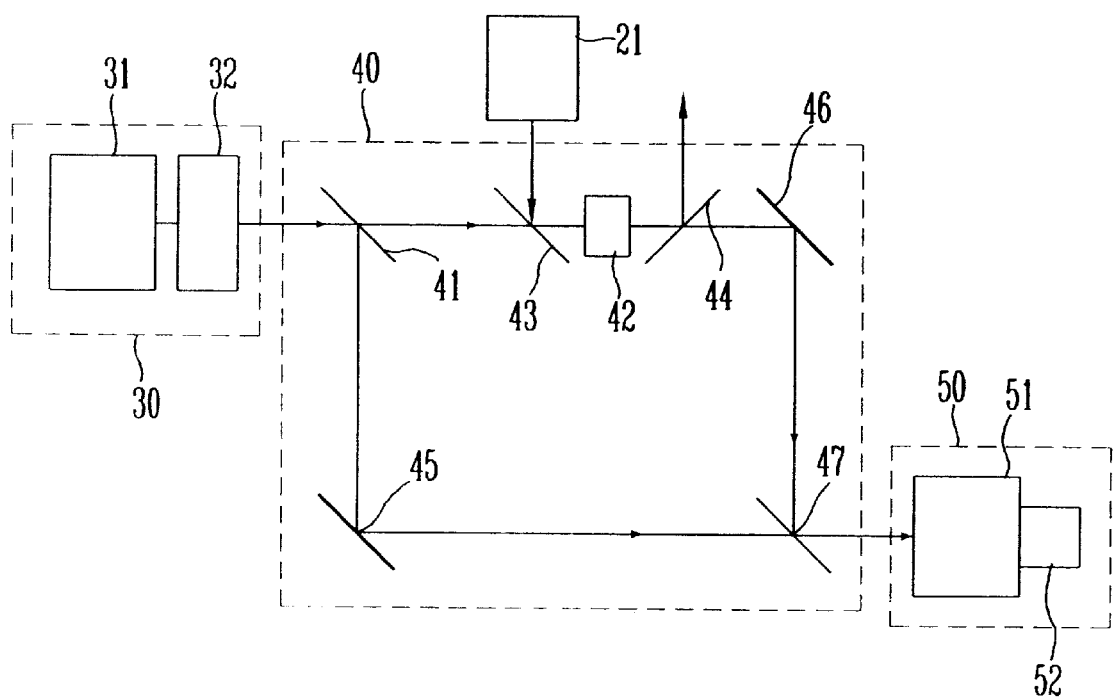
FIG. 3 is a view illustrating the structure of an apparatus for measurement of an optical pulse shape in accordance with the present invention.

FIG. 3 is a view illustrating the structure of an apparatus for measurement of an optical pulse shape in accordance with the present invention. It employs the method that transforms the temporal waveform of an incident optical pulse into a spectrum and measures the wavelength using a linearly chirped supercontinuum light source 30, a nonlinear optical interferometer 40, and an optical spectrum analyzer 50.

A linearly chirped supercontinuum light source 30 should be synchronized with an optical pulse 21 to be measured. To produce a linearly chirped supercontinuum light, it is composed of the generator 31 to generate a supercontinuum optical pulse and the dispersion medium 32 to linearly chirp the optical pulse. A nonlinear interferometer 40 can comprise various types of interferometers such as Michelson interferometer, Sagnac interferometer, Mach-Zehnder interferometer and so on. However, we will mainly describe Mach-Zehnder interferometer here. A nonlinear interferometer 40 comprises the third nonlinear medium 42, the first 50:50 optical coupler 41 to divide an incident light from the supercontinuum light source 30 into two routes, the first dichroic optical coupler (WDM1) 43 to couple the light that passes through the first optical coupler 41 and the optical pulse to be measured and thereafter to incident the coupled light to an arm of the interferometer, the second dichroic optical coupler (WDM2) 44 to extract the optical pulse to be measured, which incidents from the first dichroic optical coupler 43 and passes through the third nonlinear medium 42, from the interferometer, the first mirror 45 to reflect the light that passed through the second dichroic optical coupler 44, the second mirror 46 to reflect the light that is reflected at the first optical coupler 41, and the second 50:50 optical coupler 47 to couple the lights that are reflected from the first and second mirrors 45 and 46. A supercontinuum light that passed through the interferometer is measured by an optical spectrum analyzer 50 which employs a monochrometer 51 and an optical multi-channel analyzer 52 as a detector.

A linearly chirped supercontinuum light is the light of which the spectrum distribution is also linearly distributed in time. Therefore, if it is distributed in the time interval $[t_0, t_0+T]$, it can be described as follows in Equation 1:

$$\lambda = \lambda_0 + A/T(t - t_0), \quad t_0 \leq t \quad \text{[Equation 1]}$$

When the signal light to be measured incidents to Mach-Zehnder interferometer through WDM1 43, the interferometer transmittance, $T(\lambda)$, of the linearly chirped supercontinuum light is given as follows Equation 2:

$$T(\lambda) = \frac{I(\lambda)}{2}[1 - c] \quad \text{[Equation 2]}$$

$$\phi = \phi_0 + \delta\phi,$$

$$\delta\phi = \frac{2\pi n_2 I_p(\lambda)}{\lambda}.$$

Here, $I(\lambda)$ is the intensity of the linearly chirped supercontinuum light at the wavelength of $\lambda$, $\Phi(\lambda)$ is the phase difference between the two arms of the interferometer, $\Phi_0$ is the initial phase difference of the interferometer, $\delta\Phi$ is the amount of nonlinear phase change caused by the optical pulse that incidents to the interferometer by WDM1 43, $n_2$ is the nonlinear refraction index of the medium, and $I_p$ is the intensity of the incident light to be measured. By controlling the initial phase to have $\Phi_0 = \pi/2$, $T(\lambda)$ can be approximated as follows Equation 3:

$$T(\lambda) = \frac{I(\lambda)}{2}[1 - \sin\delta\phi(\lambda)], \quad \text{[Equation 3]}$$

$$\delta T = T(\lambda)|_{I_p} - T(\lambda)|_{I_p=0} = \frac{I(\lambda)\delta\phi}{2} = \frac{2\pi}{}$$

$\delta T$ is the difference between the transmittance when there exist an optical pulse to be measured, $I_p$, and does not exist. $\delta T(\lambda)$ and $I_p(\lambda)$ are easily measured by an optical spectrum analyzer 50, and if using an optical multi-channel analyzer 52, the wave characteristics of an optical pulse can be measured with only a single shot. The waveform of the optical pulse to be measured, $I_p(t)$, can be obtained as follows Equation 4 by coupling Equation 1 and Equation 3:

$$I(t) = I(\lambda \leftrightarrow t) = \frac{\lambda}{2\pi n_2} \frac{\delta T(\lambda)}{I(\lambda)} \bigg|_{\lambda \leftrightarrow t} \quad \text{[Equation 4]}$$

For example, if measuring a Gaussian optical pulse of 1 ps using a linearly chirped pulse having a width of 100 nm and a time interval of 100 ps, a waveform having about 1 nm full-width at half-maximum appears in the spectrum. Considering that the minimum resolution of the conventional optical spectrum analyzer is 0.05 nm, the resultant waveform is enough to be measured the real waveform.

As described above, if an optical pulse to be measured incidents to an arm of Mach-Zehnder interferometer through WDM1 41, a nonlinear phase change happens in the corresponding route. The nonlinear phase change causes the state changes of Mach-Zehnder interferometer, thereafter results the change of the output to $H_2$ port. The change of the output is determined by the intensity of the incident light. Therefore, the output change occurs corresponding to the waveform of the incident optical pulse. A linearly chirped supercontinuum light source 30 takes an important role to convert a temporal behaviour into a spectrum. Conclusively, it is a measuring method that employs a nonlinear optical effect to convert a temporal waveform of an incident optical pulse into a spectrum.

Since those having ordinary knowledge and skill in the art of the present invention will recognize additional modifications and applications within the scope thereof, the present invention is not limited to the embodiments and drawings described above.

As mentioned above, according to the present invention, the real time analysis of a waveform of the light source, that is used in a ultra-high speed optical communication system or in a measurement of the characteristics of elements, can be achieved.

What is claimed is:

1. An apparatus for measurement of an optical pulse shape comprising:
   a linearly chirped supercontinuum light source that is synchronized with an optical pulse to be measured;
   a nonlinear optical interferometer to transform the temporal waveform of an incident optical pulse into a spectrum using an incident light from said supercontinuum light source; and
   an optical spectrum analyzer to measure the wavelength of the light passing through said nonlinear interferometer so that it can measure the temporal waveform of a single optical pulse.

2. The apparatus for measurement of an optical pulse shape as claimed in claim 1, wherein said linearly chirped supercontinuum light source comprises:
   a supercontinuum optical pulse generator: and
   a dispersion medium that is used to linearly chirp the optical pulse generated from said supercontinuum optical pulse generator.

3. The apparatus for measurement of an optical pulse shape as claimed in claim 1, wherein said nonlinear optical interferometer comprises:
   a nonlinear medium;
   a first optical coupler to divide an incident light from said supercontinuum light source into two routes;
   a first dichroic optical coupler to couple the light that passes through said first optical coupler and the optical pulse to be measured and thereafter to incident the coupled light to an arm of the interferometer;
   a second dichroic optical coupler to extract the optical pulse to be measured, which incidents from said first dichroic optical coupler and passes through said third nonlinear medium, from the interferometer;
   a first mirror to reflect the light that passed through said second dichroic optical coupler;
   a second mirror to reflect the light that is reflected at said first optical coupler; and
   a second optical coupler to couple the lights that are reflected from said first and second mirrors.

4. The apparatus for measurement of an optical pulse shape as claimed in claim 1, wherein said optical spectrum analyzer employs a monochrometer and an optical multi-channel analyzer as a detector.

* * * * *